United States Patent
Guo et al.

(10) Patent No.: US 8,735,010 B2
(45) Date of Patent: May 27, 2014

(54) CONTROL SYSTEM FOR DIRECT ALCOHOL FUEL CELL

(75) Inventors: Zhen Guo, Koto-ku (JP); Masakazu Ohashi, Koto-ku (JP); Nianfang Wan, Sakura (JP); Yuki Morimatsu, Koto-ku (JP)

(73) Assignee: Fujikura Ltd., Tokyo (JP)

( * ) Notice: Subject to any disclaimer, the term of this patent is extended or adjusted under 35 U.S.C. 154(b) by 713 days.

(21) Appl. No.: 13/037,884

(22) Filed: Mar. 1, 2011

(65) Prior Publication Data

US 2011/0217610 A1 Sep. 8, 2011

(30) Foreign Application Priority Data

Mar. 2, 2010 (JP) ................................ 2010-045714

(51) Int. Cl.
*H01M 8/04* (2006.01)
(52) U.S. Cl.
CPC ...... *H01M 8/04231* (2013.01); *H01M 8/04223* (2013.01)
USPC .......................................... 429/429; 429/443
(58) Field of Classification Search
CPC ....................... H01M 8/04223; H01M 8/04231
USPC ................................................. 429/429, 443
See application file for complete search history.

(56) References Cited

U.S. PATENT DOCUMENTS

2008/0233444 A1  9/2008  Yagi et al.

FOREIGN PATENT DOCUMENTS

| JP | 2005-032601 A | 2/2005 |
| JP | 2006-351518 A | 12/2006 |
| JP | 2007-335225 A | 12/2007 |
| JP | 2007335225 A * | 12/2007 |
| JP | 2008-243383 A | 10/2008 |

OTHER PUBLICATIONS

Machine translation of JP2007335225A, Hasegawa, Japan, 2007.*
Office Action issued by the Japanese Patent Office on Dec. 3, 2013, in Japanese Patent Application No. 2010-045714.

* cited by examiner

*Primary Examiner* — Milton I Cano
*Assistant Examiner* — Brent Thomas
(74) *Attorney, Agent, or Firm* — Sughrue Mion, PLLC

(57) ABSTRACT

A control system for a direct alcohol fuel cell, comprising: a fuel tank; a fuel cell stack; a pump feeding the fuel in the fuel tank to the fuel cell stack; a switching mechanism connecting the pump selectively with the fuel and air in the fuel tank; and a control unit switching the switching mechanism to connect the pump with the air when stopping power generation of the fuel cell stack. When the generation of the fuel cell stack is stopped, feeding of the fuel to the fuel cell stack is stopped and the air is supplied to the fuel cell stack thereby pushing out the remaining fuel.

10 Claims, 3 Drawing Sheets

CONTROL SYSTEM FOR DIRECT ALCOHOL FUEL CELL

The present invention claims the benefit of Japanese Patent Applications No. 2010-045714 filed on Mar. 2, 2010 with the Japanese Patent Office, the disclosures of which is incorporated herein by reference in its entirety.

BACKGROUND

1. Field of the Invention

The present invention relates to a control system for a direct alcohol fuel cell configured to generate electric power using alcohol as fuel.

2. Discussion of the Related Art

A fuel cell, which generates electric power by oxidizing the fuel using oxidant in the presence of oxidation catalyst is well-known in the art. The fuel cell of this kind is configured to start generating electricity when the fuel and the oxidant are supplied to a fuel cell stack thereof, and the fuel cell stack continues the generation process as long as the fuel and the oxidant are being supplied thereto. Therefore, it is preferable to drain the fuel from the fuel cell stack when the power generation of the fuel cell is stopped. For example, Japanese Patent Laid-Open No. 2005-32601 discloses a direct methanol fuel cell system (abbreviated as DMFC hereinafter) using liquid methanol as the fuel, and in order to purge the fuel cell of the liquid methanol, the DMFC taught by Japanese Patent Laid-Open No. 2005-32601 is configured to inversely rotate a feeding pump of the liquid methanol thereby sucking out the liquid methanol remaining in a fuel electrode side of the fuel cell.

According to the teachings of Japanese Patent Laid-Open No. 2005-32601, unconsumed liquid methanol is thus discharged from the fuel cell by driving the feeding pump inversely. Therefore, an electrolyte membrane of the fuel cell can be prevented from being deteriorated by the remaining methanol. For this purpose, the DMFC taught by Japanese Patent Laid-Open No. 2005-32601 requires the pump capable of rotating inversely, as well as a control circuit for rotating the pump inversely. Thus, the DMFC taught by Japanese Patent Laid-Open No. 2005-32601 is structurally complicated by those devices. In addition to the above-explained disadvantage, according to the teachings of Japanese Patent Laid-Open No. 2005-32601, air containing vaporized methanol is discharged from the DMFC to the atmosphere. Consequently, the fuel is wasted and the discharged methanol vapor is harmful for the user. Therefore, the DMFC taught by Japanese Patent Laid-Open No. 2005-32601 has to be improved to avoid those disadvantages.

SUMMARY

The present invention has been conceived noting the above-mentioned problems, and it is therefore an object of the present invention is to provide a control system for a direct alcohol fuel cell, which is capable of discharging fuel from the fuel cell stack by utilizing air in the system without rotating a pump inversely, when a power generation of the fuel cell is stopped.

In order to achieve the aforementioned objective, according to an exemplary embodiment of the present invention, a control system for a direct alcohol fuel cell is provided, comprising: a fuel tank which stores liquid fuel therein; a fuel cell stack to which the liquid fuel is supplied to generate electric power; a pump, which is adapted to feed the liquid fuel stored in the fuel tank to the fuel cell stack; a switching mechanism, which is configured to connect an inlet of the pump selectively with the fuel in the fuel tank thereby allowing the pump to suck the fuel, and with air in an empty space of the fuel tank; and a control unit, which is adapted to switch the switching mechanism to connect the inlet of the pump with the air in the empty space of the fuel tank when stopping generation of power.

The control system further comprises a returning pipe connecting the fuel cell stack and the fuel tank to allow the liquid fuel or the air supplied to the fuel cell stack by the pump to be returned to the fuel tank.

The control system further comprises: an air intake pipe, which connects the switching mechanism and the air in the empty space of the fuel tank; and an air-liquid separating membrane, which is attached to the air intake pipe thereby blocking the liquid fuel from entering into the air intake pipe.

The switching mechanism includes an electromagnetic 3-way valve comprising: a first port, which is communicated with the inlet of the pump; a second port, which is communicated with the liquid fuel in the fuel tank, and connected selectively with the first port; and a third port, which is communicated with the air in the empty space of the fuel tank, and connected selectively with the first port.

The control unit may be configured to keep driving the pump during a predetermined period after switching the port of the switching mechanism in a manner to connect the inlet of the pump with the air in the empty space of the fuel tank.

According to an exemplary control system of the present invention, therefore, the air is supplied to the fuel cell stack by the pump when the power generation of the fuel cell stack is halted, and the liquid fuel remaining in the fuel cell stack is pushed by the air to the fuel tank. Thus, the fuel cell stack can be prevented from being deteriorated by the fuel remaining therein. In addition to the above-explained advantage, the control system of the present invention is configured to supply the air to the fuel cell stack using the pump. Therefore, a configuration of the system can be simplified in comparison with that of the conventional DMFC system configured to rotate a pump inversely thereby sucking the remaining fuel out of the fuel cell stack. That is, according to the control system of the present invention, it is unnecessary to drive the pump inversely. This means that an inexpensive simple pump can be used in the fuel cell system of the present invention.

More specifically, according to the control system of the present invention, the air in the fuel tank is supplied to the fuel cell stack by the pump. Therefore, an internal pressure of the fuel cell system, that is, an internal pressure of the fuel tank can be prevented from being raised (unlike) the conventional DMFC system configured to introduce the air from outside. Therefore, fuel leakage of the fuel cell will not be caused by a pressure rise in the fuel tank, and the liquid fuel will not be supplied unintentionally to the fuel cell stack by the internal pressure of the fuel tank. In addition to the above-explained advantages, since the air existing in the fuel cell system is used to push the liquid fuel out of the fuel cell stack, the pushed liquid fuel will not leak from the fuel cell system.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION

Figure 1:
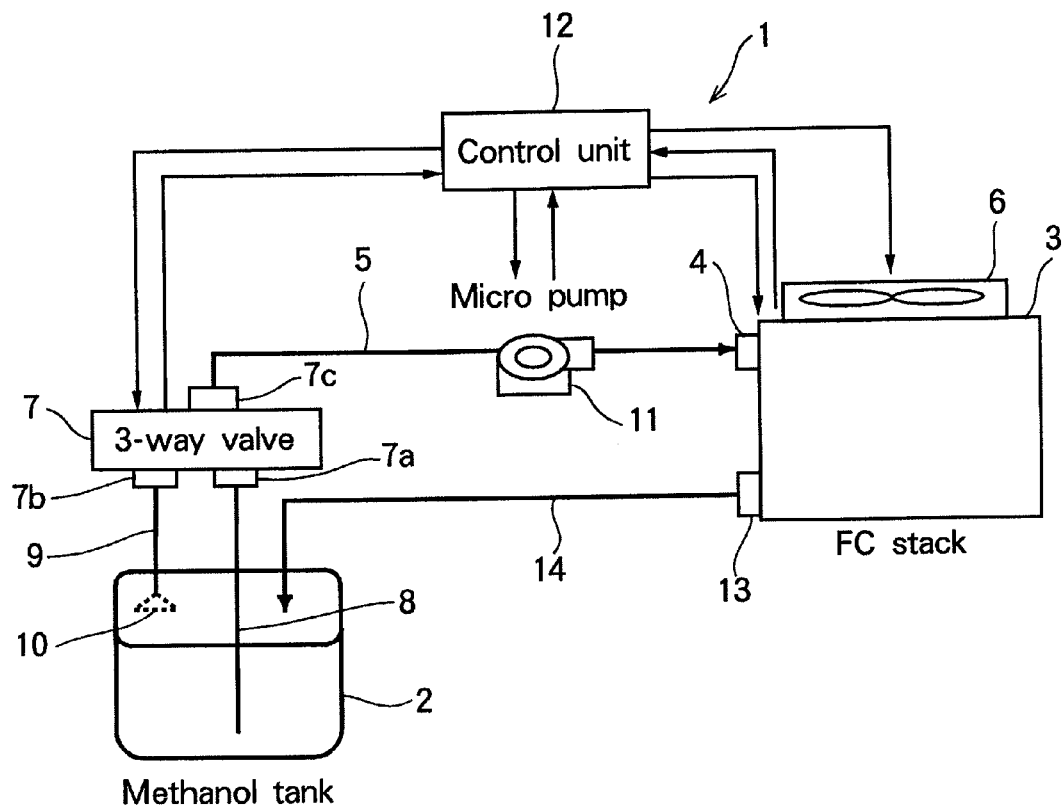
FIG. 1 is a schematic view showing an exemplary structure of the direct alcohol fuel cell to which the control system of the present invention is applied.

Hereinafter, exemplary embodiments of the control system for a direct alcohol fuel cell according to the present invention will be explained in more detail with reference to the accompanying drawings. FIG. 1 is a schematic view showing an exemplary structure of the direct alcohol fuel cell to which the control system of the present invention is applied. As shown in FIG. 1, a DMFC 1 is provided with a fuel tank 2, and a methanol solution adjusted to a predetermined concentration is stored in the fuel tank 2. The fuel tank 2 is connected with a fuel inlet 4 of a fuel cell stack 3 through a feeding pipe 5.

Specifically, the fuel cell stack 3 is a DMFC stack. Although the detailed structure thereof is not especially illustrated in FIG. 1, a conventional DMFC stack can be used. The fuel cell stack 3 is connected with an electric storage device (not shown) adapted to store and output electricity such as a condenser (i.e., a capacitor), battery and so on. For example, in case a state of charge of the electric storage device is insufficient, the electric power generated by the fuel cell stack 3 is stored in the electric storage device and supplied to a connection equipment (not shown). Conversely, in case the electric storage device is charged sufficiently, the electric power generated by the fuel cell stack 3 is supplied to the connection equipment while being adjusted to a predetermined voltage.

In order to supply oxidizer such as air (i.e., oxygen) to the fuel cell stack 3, the fuel cell stack 3 is equipped with a fan 6. Specifically, the fan 6 is configured to be supplied with electrical power, and for this purpose, the fan 6 is connected electrically with the electric storage device or the fuel cell stack 3.

Here will be explained a connection between the fuel tank 2 and the fuel cell stack 3 in more detail. As shown in FIG. 1, a 3-way valve 7 serving as the switching mechanism of the present invention is arranged on one of the end portions of the feeding pipe 5, and the other end portion of the feeding pipe 5 is connected with the fuel cell stack 3. The 3-way valve 7 comprises input ports 7a and 7b, and an output port 7c. Specifically, the port 7a is connected with one of end portions of a fuel pipe 8, and the other end portion of the fuel pipe 8 is immersed into the methanol solution thereby sucking the liquid fuel in the fuel tank 2. Likewise, the port 7b is connected with one of end portions of an air intake pipe 9, and the other end portion of the air intake pipe 9 is inserted into the fuel tank 2 in a manner to suck the air in the empty space of the fuel tank 2. Meanwhile, a port 7c of the 3-way valve 7 is connected with said one of the end portions of the feeding pipe 5. Therefore, the liquid fuel and the air can be supplied selectively to the fuel cell stack 3 from the fuel tank 2 via the 3-way valve 7, by connecting the port 7c selectively with the port 7a and the port 7b.

In addition, an air-liquid separating membrane 10 is attached to the end portion of intake side of the air intake pipe 9 inserted into the fuel tank 2. Specifically, air permeability of the air-liquid separating membrane 10 is higher than liquid permeability thereof, and for example, expanded microporous polytetrafluoroethylene (abbreviated as ePTFE), silicon, and polyolefin such as polyethylene can be used to form the air-liquid separating membrane 10. Therefore, the liquid phase methanol can be blocked by the air-liquid separating membrane 10 to enter into the air pipe 9.

Although not especially illustrated, the intake port of the aforementioned 3-way valve 7 to be connected with the port 7c of output side is switched electrically between the ports 7a and 7b. Specifically, in the example shown in FIG. 1, an electromagnetic valve is used to serve as the 3-way valve 7, and the intake port to be connected with the output port is switched by applying voltage thereto. That is, a role of the 3-way valve 7 is to switch a flow channel, and for this purpose, a valve configured to switch the flow channel using a driving member such as a motor may also be used as the 3-way valve 7 instead of the electromagnetic valve.

On the feeding pipe 5, a micro pump 11 is arranged between the 3-way valve 7 and the fuel cell stack 3. Specifically, an inlet of the micro pump 11 is connected with the port 7c of the 3-way valve 7 through the feeding pipe 5. As described, the port 7a of the 3-way valve 7 is communicated with the liquid fuel in the fuel tank 2, and the port 7b of the 3-way valve 7 is communicated with the air in the fuel tank 2. Therefore, the inlet of the micro pump 11 can be connected selectively with the liquid fuel and the air in the fuel tank 2. Specifically, the micro pump 11 is provided to feed the liquid fuel in the fuel tank 2 to the fuel cell stack 3, and to discharge reaction product such as carbon dioxide resulting from oxidizing the liquid fuel and residue after reaction from the fuel cell stack 3. For this purpose, a conventional micro pump can be used to serve as the micro pump 11. For example, the micro pump 11 can be connected electrically with the fuel cell stack 3 to be driven according to the electricity generated by the fuel cell stack 3. However, in order to supply the liquid fuel continuously to the fuel cell stack 3 at a constant rate, it is preferable to connect the micro pump 11 with the aforementioned electric storage device thereby driving the micro pump 11 by supplying electric power from the electric storage device. Specifically, the micro pump 11 is driven by the electric power supplied from the electric storage device in case fuel cell stack 3 is generating the electric power.

The DMFC 1 is further provided with a control unit 12 composed mainly of a microcomputer. For instance, although not especially illustrated in the accompanying figures, the control unit 12 is configured to observe a generating condition of the fuel cell stack 3, to drive and stop the fan 6 and the micro pump 11, and to switch the input port of the 3-way valve 7 between the port 7a and 7b. Specifically, in order to switch the input port of the 3-way valve 7, the control unit 12 outputs a signal for switching the input port between the port 7a and 7b when a signal for starting or stopping the generation of the fuel cell stack 3 is inputted thereto from a power unit of an electric equipment to which the DMFC 1 is applied, or when the control unit 12 itself detects a fact that the fuel cell stack 3 starts or stops generation. Likewise, the control unit 12 also outputs signals for driving and stopping the micro pump 11 and the fan 6.

In order to observe generating condition of the fuel cell stack 3, for example, the control unit 12 is configured to detect a temperature of the fuel cell stack 3. Specifically, in case the temperature of the fuel cell stack 3 is raised to a certain level, the liquid fuel is stopped to be supplied to the fuel cell stack 3. For this purpose, the micro pump being driven is halted when the temperature of the fuel cell stack 3 exceeds a predetermined reference temperature. In addition, a sensor (not shown) for detecting leakage of the liquid fuel can be arranged in a casing of the DMFC 1. In this case, when the sensor detects a leakage of the liquid fuel inside of the casing, the control unit 12 stops feeding of the liquid fuel to the fuel cell stack 3.

As shown in FIG. 1, one of end portions of a drainpipe 14 is connected with an outlet 13 of the fuel cell stack 3, and the other end portion of the drainpipe 14 is connected with the fuel tank 2. Therefore, the aforementioned reaction product and residue after reaction can be discharged from the fuel cell stack 3 to the fuel tank 2. Thus, a circuit is formed by the feeding pipe 5 for feeding the liquid fuel from the fuel tank 2 to the fuel cell stack 3 via the 3-way valve 7, and the drainpipe 14 for discharging the reaction product and residue after reaction from the fuel cell stack 3 to the fuel tank 2.

Figure 2:
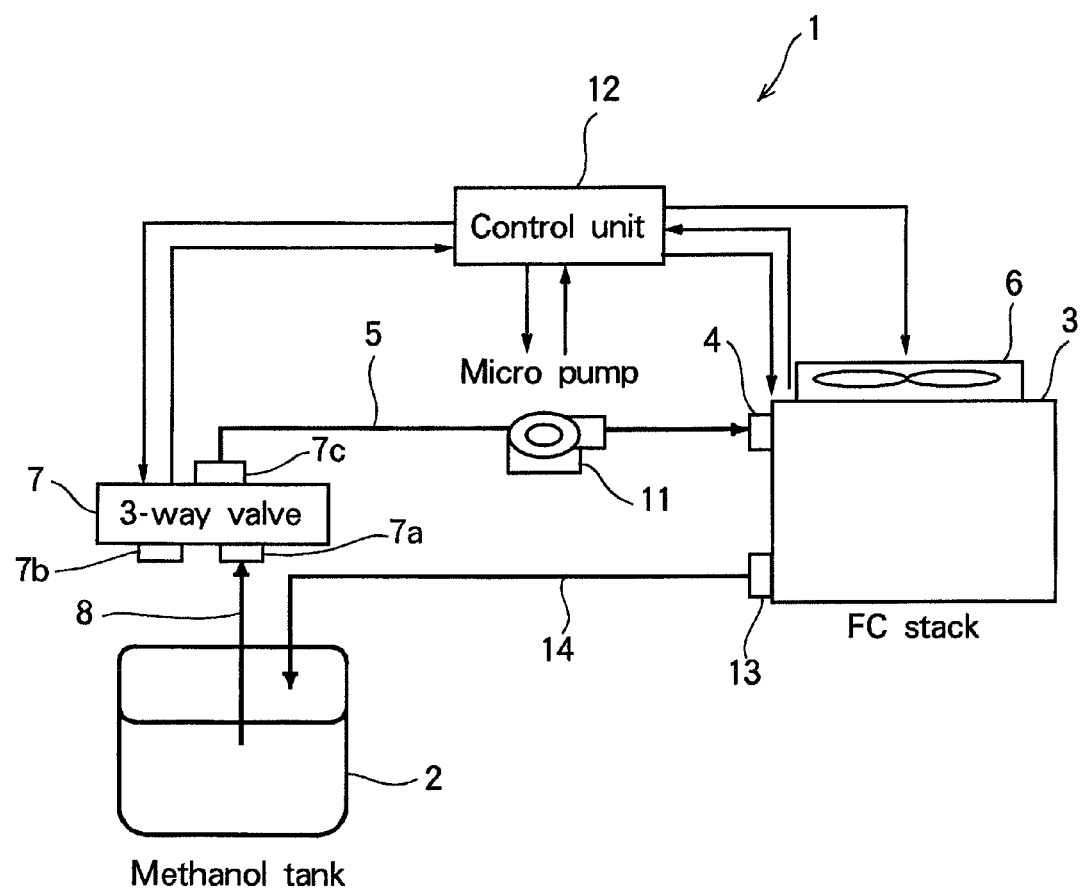
FIG. 2 is a schematic view showing the direct alcohol fuel cell shown in FIG. 1 generating electric power.

Next, here will be explained an action of the control system for the direct alcohol fuel cell of the present invention thus structured. FIG. 2 is a view showing the DMFC 1 shown in FIG. 1 generating electric power. As explained, in case the DMFC 1 is carrying out a power generation process, the port 7a of the 3-way valve 7 is opened and the port 7b of the 3-way valve 7 is closed by the signal(s) from the control unit 12. As also explained, the micro pump 11 and the fan 6 are being driven by the electric power from the storage device in this situation.

When the micro pump 11 is started to be driven, the liquid fuel reserved in the fuel tank 2 is sucked into the fuel pipe 8 from one of the end portions of the fuel pipe 8 lowered into the liquid fuel. The liquid fuel thus sucked into the fuel pipe 8 is supplied to an anode side of the fuel cell stack 3 through the feeding pipe 5 via the ports 7a and 7c of the 3-way valve 7. In this situation, the air used as the oxidizer, that is, oxygen is supplied to a cathode side of the fuel cell stack 3 by the fan 6. Thus, the fuel cell stack 3 is configured to generate electric power by oxidizing the methanol fuel by the oxygen in the presence of oxidation catalyst (not shown). For example, the electric power thus generated by the fuel cell stack 3 is stored into the aforementioned electric storage device.

Figure 3:
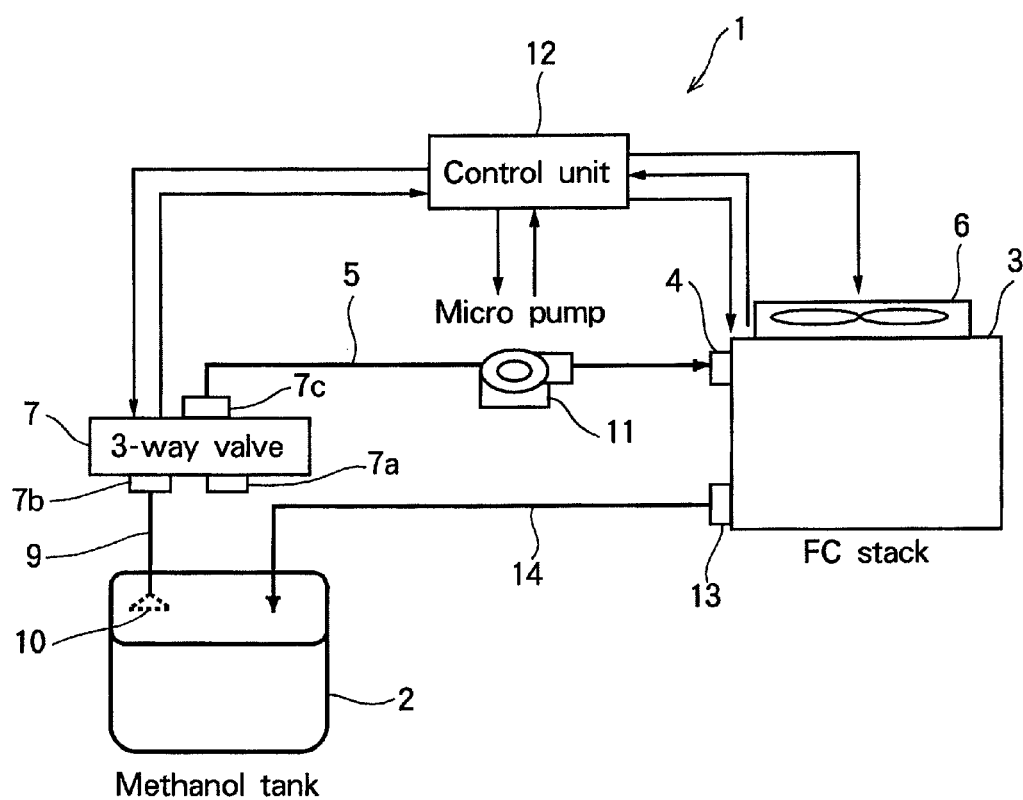
FIG. 3 is a schematic view showing the direct alcohol fuel cell shown in FIG. 1 stopping generation of electric power.

FIG. 3 is a view showing the DMFC 1 shown in FIG. 1 stopping generation of the electric power. In case the signal for stopping the power generation is inputted to the control unit 12, or in case the control unit 12 detects a cessation of the generation by the fuel cell stack 3, that is, in case the DMFC 1 stops generation of the electric power, the control unit 12 outputs signal(s) for closing the port 7a and opening the port 7b of the 3-way valve 7.

In addition, the micro pump 11 is kept to be driven for a duration of several Minutes (e.g., for two to three minutes) after a moment when the signal for stopping generation is inputted to the control unit 12, or after a moment when the control unit 12 detects a cessation of the generation by the generating section 3. Such duration time of driving the micro pump 11 after stopping the power generation of the generating section 3 is set for the purpose of discharging the methanol fuel and the reaction product from the generating section 3. Specifically, a length of the duration time for driving the micro pump 11 can be set in advance on the basis of experimental result. Meanwhile, the fan 6 is stopped after switching the input port of the 3-way valve 7 from the port 7a to the port 7b, or stopped simultaneously with the moment when switching from the port 7a to the port 7b.

In this situation, the air in the fuel tank 2 is supplied to the anode side of the fuel cell stack 3 from one of the end portions of the air pipe 9 inserted into the fuel tank 2, through the ports 7b and 7c of the 3-way valve 7, and the feeding pipe 5. As a result, the liquid fuel remaining in the anode side of the fuel cell stack 3 is pushed by the air out of the fuel cell stack 3 together with the reaction product, and then returned to the fuel tank 2 through the discharging pipe 14.

Thus, when the generation of the fuel cell stack 3 is stopped, feeding of the liquid fuel to the fuel cell stack 3 is stopped, and the air in the fuel tank 2 is supplied to the fuel cell stack 3 by the micro pump 11. Therefore, the methanol solution serving as the liquid fuel is discharged from the fuel cell stack 3 by the air supplied thereto, and the liquid fuel thus pushed out is then returned to the fuel tank 2. For this reason, the liquid fuel will not remain in the fuel cell stack 3 in a large quantity even after stopping the power generation. That is, the fuel cell stack 3 will not be deteriorated by the liquid fuel remaining therein. In other words, an electrolyte membrane of the fuel cell stack 3 will not be damaged by methanol fuel remaining in the fuel cell stack 3. Moreover, the exemplary DMFC 1 of the present invention is configured to supply the air to the fuel cell stack 3 using the micro pump 11 as described. Therefore, in addition to the above-explained advantage, the structure of the DMFC 1 can be simplified in comparison with that of the conventional DMFC system in which the methanol fuel is discharged from the fuel cell stack by driving a pump inversely. As also described, according to the exemplary DMFC 1 of the present invention, the air in the fuel tank 2 is supplied to the generating section 3 thereby pushing the remaining methanol fuel out of the fuel cell stack 3. Therefore, in addition to the above-explained advantages, the internal pressure of the DMFC 1, specifically, the internal pressure of the fuel tank 2 can be prevented from being raised. For this reason, a leakage of the methanol fuel from the DMFC 1 resulting from a pressure rise in the fuel tank 2 will not occur, and the methanol fuel will not be supplied unintentionally from the fuel tank 2 to the fuel cell stack 3 by the pressure rise in the fuel tank 2. Furthermore, according to the exemplary DMFC 1 of the present invention, the reaction product and the residue after reaction are evacuated from the fuel cell stack 3 utilizing the air in the fuel tank 2, and the reaction product and the residue after reaction are returned to the fuel tank 2 together with the air. Therefore, in addition to the above-explained advantages, the air containing methanol will not be discharged outside of the DMFC 1.

In the exemplary DMFC 1, the fuel tank 2 is used to reserve the liquid fuel. However, according to the present invention, the fuel tank 2 should not be limited to the structure as explained in the description. For example, an air-liquid separating device adapted to separate the reaction product and the residue after reaction evacuated from the fuel cell stack 3 into gas component and liquid component may also be used instead of the fuel tank 2. Alternatively, according to the exemplary DMFC 1 of the present invention, it is also possible to use a main tank reserving fuel of highly-concentrated liquid fuel in combination with a sub tank functioning as a concentration buffering device to which low-concentrated liquid fuel is returned from the fuel cell stack 3. In this case, those liquid fuels are mixed together when supplied to the fuel cell stack 3 thereby adjusting the concentration thereof to a predetermined level. That is, fundamental requirements for the fuel tank 2 is to be arranged on the circuit, and to be configured to supply the fuel therein to the fuel cell stack 3 and to receive the reaction product and the residue directly or indirectly from the fuel cell stack 3. In case the air-liquid separating device or the concentration buffering device is used instead of the fuel tank 2, the air contained therein is supplied to the fuel cell stack 3 by the micro pump thereby pushing out the remaining fuel when stopping the power generation, and the fuel thus pushed out of the fuel cell stack 3 is returned to the air-liquid separating device or the fuel buffering device together with the air.

Although the above exemplary embodiment of the present invention have been described, it will be understood by those skilled in the art that the present invention should not be limited to the described exemplary embodiments, but that various changes and modifications can be made within the spirit and scope of the present invention.

What is claimed is:

1. A control system for a direct alcohol fuel cell, comprising:
   a fuel tank, which stores liquid fuel therein;
   a fuel cell stack, to which the liquid fuel is supplied to generate electric power;
   a pump, to feed the liquid fuel stored in the fuel tank to the fuel cell stack;
   a switching mechanism, to connect between an inlet of the pump and the fuel in the fuel tank, and between the inlet of the pump and air in an empty space of the fuel tank; and
   a control unit, to control the switching mechanism.

2. The control system for a direct alcohol fuel cell according to claim 1, further comprising:
   a returning pipe connecting the fuel cell stack and the fuel tank to return the liquid fuel and the air supplied to the fuel cell stack by the pump to the fuel tank.

3. The control system for a direct alcohol fuel cell according to claim 1, further comprising:
   an air intake pipe, to connect the switching mechanism with the air in the empty space of the fuel tank; and
   an air-liquid separating membrane attached to the air intake pipe to block the liquid fuel from entering into the air intake pipe.

4. The control system for a direct alcohol fuel cell according to claim 1, wherein the switching mechanism includes an electromagnetic 3-way valve comprising:
   a first port, which is connected with the inlet of the pump;
   a second port, which is connected with the liquid fuel in the fuel tank, and connected selectively with the first port; and
   a third port, which is connected with the air in the empty space of the fuel tank, and connected selectively with the first port.

5. The control system for a direct alcohol fuel cell according to claim 1, wherein:
   the control unit includes a means configured to keep driving the pump during a predetermined period after switching the port of the switching mechanism in a manner to connect the inlet of the pump with the air in the empty space of the fuel tank.

6. The control system for a direct alcohol fuel cell according to claim 1, wherein the switching mechanism connects the liquid fuel stored in the fuel tank to the fuel cell stack when power generation is started in the fuel cell stack.

7. The control system for a direct alcohol fuel cell according to claim 1, wherein the switching mechanism connects the inlet of the pump with the air in the empty space of the fuel tank when power generation is stopped in the fuel cell stack.

8. The control system for a direct alcohol fuel cell according to claim 1, further comprising a fan connected electrically with the fuel cell stack.

9. The control system for direct alcohol fuel cell according to claim 1, further comprising a feeding pipe connecting the switching mechanism to the fuel cell stack.

10. The control system for a direct alcohol fuel cell according to claim 1, wherein a micro-pump is arranged between the switching mechanism and the fuel cell stack.

* * * * *